(12) United States Patent
Alshareef (10) Patent No.: US 12,478,725 B2
(45) Date of Patent: Nov. 25, 2025

(54) NASAL SUCTION APPARATUS (71) Applicant: KING SAUD UNIVERSITY, Riyadh (SA)

(72) Inventor: Mohammad Ali Alshareef, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/243,880

(22) Filed: Sep. 8, 2023

(65) Prior Publication Data

US 2025/0082837 A1    Mar. 13, 2025

(51) Int. Cl.
*A61M 1/00* (2006.01)
*A61M 25/00* (2006.01)
*A61M 25/10* (2013.01)

(52) U.S. Cl.
CPC ............ *A61M 1/87* (2021.05); *A61M 25/007* (2013.01); *A61M 25/10* (2013.01); *A61M 2210/0618* (2013.01)

(58) Field of Classification Search
CPC ...... A61M 1/87; A61M 25/007; A61M 25/10; A61M 2210/0618; A61M 2210/0681; A61M 31/00; A61M 16/0666; A61M 2025/0031; A61M 25/0069; A61M 25/0026; A61M 25/0071; A61M 25/008; A61M 1/84; A61M 25/1011; A61B 17/24; A61B 1/233; A61B 2018/00327; A61B 2018/0022; A61B 2218/007; A61B 17/12136; A61B 1/00082; A61B 2018/0032; A61B 17/12104; A61B 17/12022; A61B 18/1492; A61P 35/00; A61P 11/02; A61K 9/0043; A61K 2039/543; A61F 2/186; A61F 2007/0006; A61F 2/90
See application file for complete search history.

(56) References Cited

U.S. PATENT DOCUMENTS

| | | | |
|---|---|---|---|
| 3,903,893 A * | 9/1975 | Scheer | A61B 17/12136 604/101.05 |
| 4,334,534 A | 6/1982 | Ozaki | |
| 5,011,474 A * | 4/1991 | Brennan | A61M 27/00 606/196 |
| 5,279,599 A | 1/1994 | Wilk | |
| 5,599,304 A * | 2/1997 | Shaari | A61M 1/84 604/173 |

(Continued)

Primary Examiner — Nicholas J. Weiss
Assistant Examiner — Brandon W. Levy
(74) Attorney, Agent, or Firm — Nath, Goldberg & Meyer; Joshua B. Goldberg (57) ABSTRACT A nasal suction apparatus used during endoscopic sinus surgeries. The nasal suction apparatus includes a catheter having a proximal end and a distal end, with the catheter being closed on the distal end to focus suction through the sides of the catheter. The catheter includes first and second lumens extending parallel from the distal end to the proximal end, with the lumens being separated by an inner partition. Suction holes on the distal end of the catheter provide suction to the surgical site. A flexible tube is attached to the catheter to provide connection with a source of suction. A porous fabric cover is placed over the suction holes to prevent obstruction of the suction holes by solid debris such as blood clots and tissue fragments, while allowing for passage of air and liquid.

5 Claims, 8 Drawing Sheets

(56) References Cited

U.S. PATENT DOCUMENTS

| | | | | |
|---|---|---|---|---|
| 6,027,478 A | * | 2/2000 | Katz | A61B 17/12136 |
| | | | | 606/199 |
| 6,191,341 B1 | * | 2/2001 | Shippert | A61F 13/36 |
| | | | | 604/385.18 |
| 8,092,415 B2 | * | 1/2012 | Moehle | A61M 25/003 |
| | | | | 604/4.01 |
| 8,500,939 B2 | * | 8/2013 | Nimkar | A61M 25/0026 |
| | | | | 604/265 |
| 10,099,027 B2 | | 10/2018 | Cole et al. | |
| 10,524,814 B2 | | 1/2020 | Chang et al. | |
| 2004/0049165 A1 | | 3/2004 | Thompson et al. | |
| 2010/0168688 A1 | * | 7/2010 | Santora | A61B 17/88 |
| | | | | 604/319 |
| 2012/0232525 A1 | | 9/2012 | Golagani | |
| 2013/0053753 A1 | * | 2/2013 | King | A61M 25/007 |
| | | | | 604/6.16 |
| 2017/0189644 A1 | * | 7/2017 | Fischer, Jr. | A61B 1/018 |
| 2021/0386445 A1 | * | 12/2021 | Burban | A61B 17/24 |

* cited by examiner

NASAL SUCTION APPARATUS

BACKGROUND

Field

The disclosure of the present patent application relates to suction catheters, and particularly to a nasal suction apparatus used during endoscopic sinus surgeries and endonasal skull base surgeries.

Description of Related Art

Endoscopic sinus surgery (ESS) has developed rapidly in the last several decades as a procedure to help patients remove blockages and treat other problems in the sinuses using an endoscope (i.e., a thin tube equipped with a camera, light, and/or a cutting instrument). One of the primary concerns during endoscopic sinus surgery is surgical bleeding, which can negatively affect both the duration and the results of surgery. Bleeding impairs adequate visualization by the endoscope of the surgical field and anatomical landmarks. Bleeding can also increase the possibility of complications, including damage to the skull base arteries (anterior or posterior ethmoid arteries), skull base injury (cerebrospinal fluid leakage), orbital injury, and damage to the optic nerve and the internal carotid artery.

The nasal passages and sinuses are areas in which access is not easy. During endoscopic nasal surgery, a surgeon typically uses one hand to perform the surgery and the other hand to hold the endoscope, which increases the challenge of controlling bleeding in the nasal passages. Endoscopic sinus surgery requires frequent suctioning and endoscope cleaning to ensure proper visualization.

It would be desirable to be able to provide continuous suctioning of the nasal cavity during endoscopic nasal surgeries such as, by way of non-limiting example, polypectomies, inferior turbinate ablations, and nasal mass biopsies, to name a few.

Attempts to provide suction during endoscopic nasal surgeries have been made previously. Such previous devices typically use a single lumen suction catheter for channeling suction, which carries the risk of the tube collapsing under heavy vacuum pressure, as a single lumen suction tube lacks reinforcement. Fabric covers have been used previously in nasal suction devices to prevent damage to the nasal tissues, with the covers typically having cut-out openings for suction. The use of cut-out openings in the cover conveys a risk of obstruction of the openings caused by suctioning debris, such as blood clots or tissue fragments, which would reduce or block the device's ability to provide suction.

Thus, an improved nasal suction apparatus solving the aforementioned problems is desired.

SUMMARY

The present subject matter relates to a nasal suction apparatus used during endoscopic sinus surgeries and the like. The nasal suction apparatus includes a catheter having a proximal end and a distal end, where the catheter is closed on the distal end to focus suction through the sides of the catheter. The catheter includes first and second lumens extending parallel from the distal end to the proximal end, with the lumens being separated by an inner partition. The usage of dual lumens with a dividing partition provides enhanced structural rigidity of the catheter as protection against collapse of the catheter walls under applied negative pressure.

The nasal suction apparatus can include suction holes positioned in the distal end of the catheter for providing suction to the surgical site. The suction holes can be arranged on opposite sides of the catheter in an alternating, staggered relationship. By arranging the suction holes oppositely in an alternating, staggered relationship, the rigidity and strength of the catheter can be improved by comparison with a conventional design in which suction holes are in a strictly opposite arranged configuration. A flexible tube can be attached to the catheter at its proximal end to provide connection with a source of suction. A porous fabric cover can be placed over the suction holes to act as a filter and prevent obstruction of the suction holes by blood clots and debris, such as tissue fragments, while allowing for passage of air, moisture, and liquid. By using a porous fabric cover, the obstruction of the suction holes by solid debris can be prevented, and the equal distribution of suction air through the suction holes can be ensured. In a non-limiting example, the material of the porous fabric cover may be two-ply sterile cotton or other surgical gauze. Likewise, any material capable of allowing the suction of liquid or air therethrough while preventing passage of solid debris may serve as a suitable material for the porous fabric cover.

Accordingly, in an embodiment, the present subject matter relates to a nasal suction apparatus, comprising: a catheter having a proximal end and a distal end, the catheter comprising first and second lumens extending parallel to one another from the proximal end to the distal end, the first and second lumens being divided by an inner partition, wherein a plurality of suction holes are formed in the distal end of said catheter, the plurality of suction holes being arranged on opposite sides of the catheter in an alternating, staggered relationship; a flexible tube attached to the catheter at the proximal end thereof, the flexible tube configured to be in connection with a source of suction; and a porous fabric cover placed over said plurality of suction holes, the fabric cover preventing obstruction of the plurality of suction holes by solid debris while allowing suction of air and liquid.

In an alternative embodiment, the nasal suction catheter may include a cuff for retaining the catheter in a fixed position during a surgical procedure. In a non-limiting example, the cuff may be a balloon in connection with an inflation tube. The inflation tube can be connected to a source of inflation, such as a syringe or other pump. A pilot balloon and a valve can be placed on the inflation tube preceding the proximal end of the catheter. The pilot balloon inflates or deflates in conjunction with, and as an indication of, the inflation of the balloon cuff. A valve may be provided in connection with the inflation tube to allow for the inflation or deflation (i.e., pressure relief) of the balloon cuff. The valve may be, for example, a one-way check valve that provides pressure relief by releasing air into the surrounding environment. In use, the catheter can be inserted past the nasal vestibule and into the nasal cavity, and suction is applied to the catheter through a flexible tube connected to a proximal end of the catheter.

In another embodiment, the present subject matter relates to a nasal suction apparatus, comprising: a catheter having a proximal end and a distal end, the catheter being closed at a distal end face and comprising first and second lumens extending parallel to one another from the proximal end to the distal end, the first and second lumens being divided by an inner partition contacting said distal end face, wherein a plurality of suction holes are formed in the distal end of said catheter, the plurality of suction holes being arranged on opposite sides of the catheter in an alternating, staggered relationship; a flexible tube attached to the catheter at the proximal end thereof, the flexible tube configured to be in connection with a source of suction; and a porous fabric cover placed over said plurality of suction holes, the fabric cover preventing obstruction of the plurality of suction holes by solid debris while allowing suction of air and liquid.

In a further embodiment, the present subject matter relates to a method of providing suction during a surgical procedure, the method comprising: inserting a distal end of a catheter into a nasopharynx region of a patient; and applying suction to the catheter through a flexible tube connected to a proximal end of the catheter, wherein the catheter comprises: first and second lumens extending from the proximal end to a distal end of the catheter in parallel to one another, the first and second lumens being separated by an inner partition, wherein a plurality of suction holes are positioned in the distal end of the catheter, the plurality of suction holes being arranged on opposite sides of the catheter in an alternating, staggered relationship; and a porous fabric cover placed over the plurality of suction holes, the cover preventing obstruction of the plurality of suction holes by solid debris and allowing suction of air and liquid.

BRIEF DESCRIPTION OF DRAWINGS

Similar reference characters denote corresponding features consistently throughout the attached drawings.

DETAILED DESCRIPTION

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed therein are not to be considered as limiting, unless the claims expressly state otherwise.

In an embodiment, the present subject matter relates to a nasal suction apparatus, comprising: a catheter having a proximal end and a distal end, the catheter comprising first and second lumens extending parallel to one another from the proximal end to the distal end, the first and second lumens being divided by an inner partition, wherein a plurality of suction holes are formed in the distal end of said catheter, the plurality of suction holes being arranged on opposite sides of the catheter in an alternating, staggered relationship; a flexible tube attached to the catheter at the proximal end thereof, the flexible tube configured to be in connection with a source of suction; and a porous fabric cover placed over said plurality of suction holes, the fabric cover preventing obstruction of the plurality of suction holes by solid debris while allowing suction of air and liquid.

In an alternative embodiment, the nasal suction catheter may include a cuff for retaining the catheter in a fixed position during a surgical procedure. In a non-limiting example, the cuff may be a balloon in connection with an inflation tube. The inflation tube can be connected to a source of inflation, such as a syringe or other pump. A pilot balloon and a valve can be placed on the inflation tube preceding the proximal end of the catheter. The pilot balloon inflates or deflates in conjunction with, and as an indication of, the inflation of the balloon cuff. A valve may be provided in connection with the inflation tube to allow for the inflation or deflation (i.e., pressure relief) of the balloon cuff. The valve may be, for example, a one-way check valve that provides pressure relief by releasing air into the surrounding environment. In use, the catheter can be inserted past the nasal vestibule and into the nasal cavity, and suction is applied to the catheter through a flexible tube connected to a proximal end of the catheter. In addition, the inner partition can contact an inner surface of a distal end face of the catheter.

In another embodiment, the present subject matter relates to a nasal suction apparatus, comprising: a catheter having a proximal end and a distal end, the catheter being closed at a distal end face and comprising first and second lumens extending parallel to one another from the proximal end to the distal end, the first and second lumens being divided by an inner partition contacting said distal end face, wherein a plurality of suction holes are formed in the distal end of said catheter, the plurality of suction holes being arranged on opposite sides of the catheter in an alternating, staggered relationship; a flexible tube attached to the catheter at the proximal end thereof, the flexible tube configured to be in connection with a source of suction; and a porous fabric cover placed over said plurality of suction holes, the fabric cover preventing obstruction of the plurality of suction holes by solid debris while allowing suction of air and liquid.

In a further embodiment, the present subject matter relates to a method of providing suction during a surgical procedure, the method comprising: inserting a distal end of a catheter into a nasopharynx region of a patient; and applying suction to the catheter through a flexible tube connected to a proximal end of the catheter, wherein the catheter comprises: first and second lumens extending from the proximal end to a distal end of the catheter in parallel to one another, the first and second lumens being separated by an inner partition, wherein a plurality of suction holes are positioned in the distal end of the catheter, the plurality of suction holes being arranged on opposite sides of the catheter in an alternating, staggered relationship; and a porous fabric cover placed over the plurality of suction holes, the cover preventing obstruction of the plurality of suction holes by solid debris and allowing suction of air and liquid.

In this regard, according to the present methods, prior to reaching the nasopharynx region, the catheter can be inserted through a nasal vestibule of the patient. In an alternative embodiment, prior to reaching the nasopharynx region, the catheter can be inserted through an oral cavity of the patient. In either embodiment, the distal end of the catheter can be closed and in contact with the inner partition.

Figure 1:
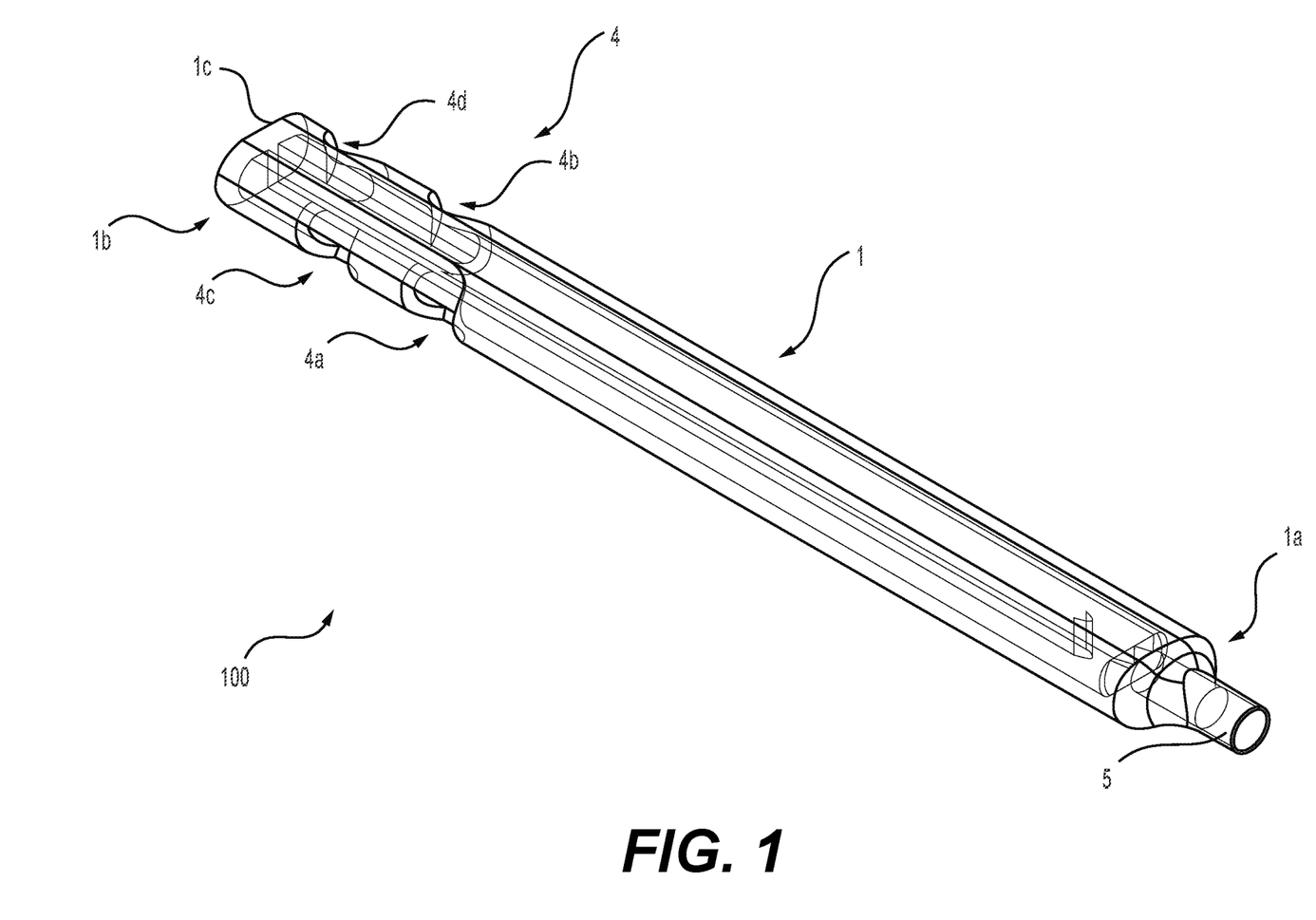
FIG. 1 is a perspective view of a catheter of a nasal suction apparatus.

Referring to FIG. 1, a catheter 1 of a nasal suction apparatus 100 is shown. Catheter 1 has a proximal end 1a, and a distal end 1b closed by distal end face 1c. Positioned at distal end 1b of catheter 1 are suction holes 4. In the non-limiting example of FIG. 1, four holes 4a-4d are shown. It should be understood, while four holes are illustrated, any suitable number of suction holes may be provided. Suction holes 4a-4d are positioned in the sides of catheter 1, and distal end 1b of catheter 1 is closed at distal end face 1c so that suction may be focused through the sides of catheter 1. During an endoscopic surgical procedure of the sinus areas, a patient is typically positioned in a supine position (i.e., laying on their back) or in a semi-sitting position (i.e., angled at approximately) 45°. By channeling the suction through the sides of catheter 1, suction pressure can be focused at a lowermost gravitational site to effectively suction bleeding during such procedures. More details on this aspect will be discussed below, with particular reference to FIG. 5.

Still referring to FIG. 1, suction holes 4a-4d are shown in an alternating, staggered relationship on opposite sides of catheter 1. This arrangement provides better structural rigidity in comparison to a conventional configuration where suction holes are positioned directly opposite from each other.

Figure 2A:
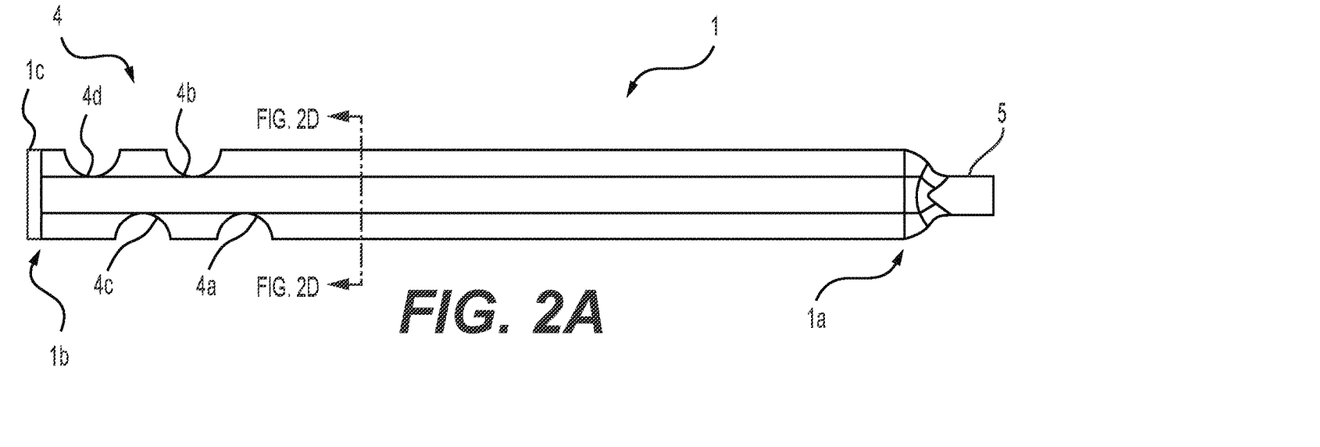
FIG. 2A is a top view of the catheter of the nasal suction apparatus.
Figure 2B:
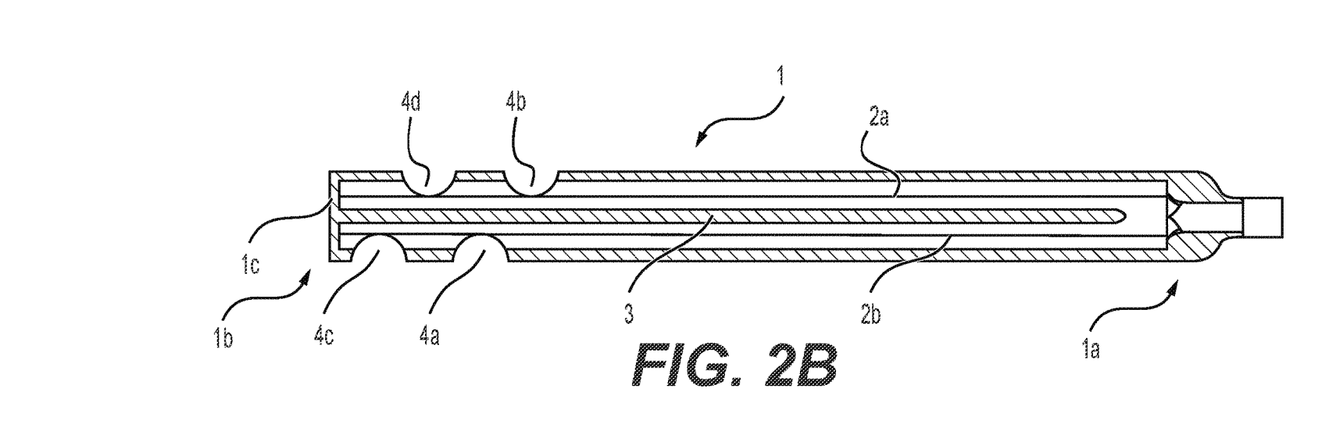
FIG. 2B is a top view in section of the catheter of the nasal suction apparatus.

Continuing now to FIGS. 2A and 2B, the alternating and staggered relationship of suction holes 4 on opposite sides of catheter 1 can be better seen.

In FIG. 2B, a sectional view is provided of catheter 1, showing a pair of lumens 2a, 2b. Lumens 2a, 2b extend from proximal end 1a to closed distal end face 1c and are separated by a partition 3. Partition 3 terminates at distal end 1b in contact with an inner surface of closed distal end face 1c. In comparison with a single lumen design, the dual lumen design of nasal suction apparatus 100 provides improved structural rigidity and avoids potential collapse of the catheter walls under applied negative pressure.

Figure 2C:
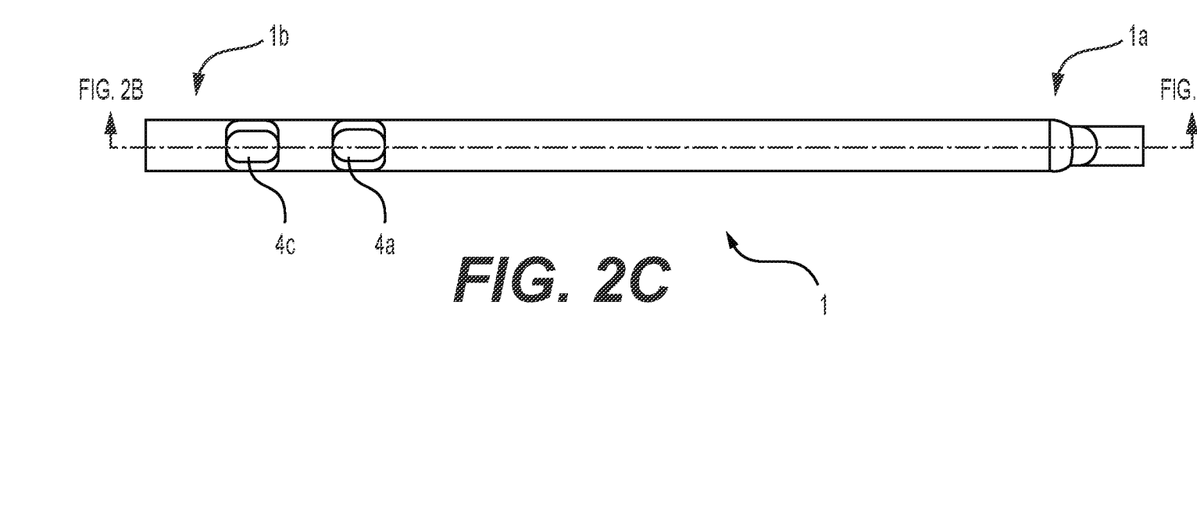
FIG. 2C is a side view of the catheter of the nasal suction apparatus.
Figure 2D:
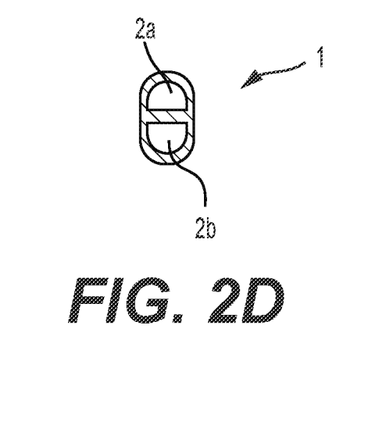
FIG. 2D is a cross-sectional view of the catheter of FIG. 2A, taken along cross-sectional cut lines D-D.
Figure 2E:
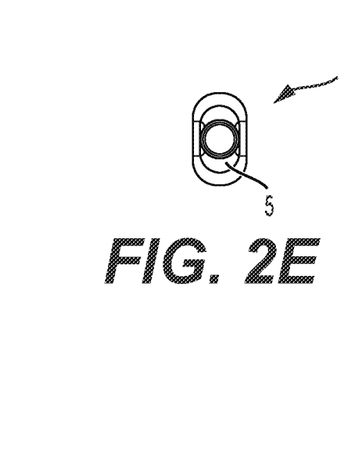
FIG. 2E is a rear view of the catheter of the nasal suction apparatus.

FIG. 2C is a side view of catheter 1 showing suction holes 4a, 4c positioned in distal end 1b on one side of catheter 1. FIG. 2D is a cross-sectional view taken along lines D-D of FIG. 2A. Lumens 2a, 2b are shown in FIG. 2D separated by partition 3. As can be seen in FIG. 2D, inner partition 3 provides an additional structural reinforcement member in comparison with a single lumen design (without the inclusion of an inner partition). FIG. 2E is a view of the proximal end 1a, showing mating end 5 of catheter 1 for connection with a flexible tube and source of suction.

Figure 3:
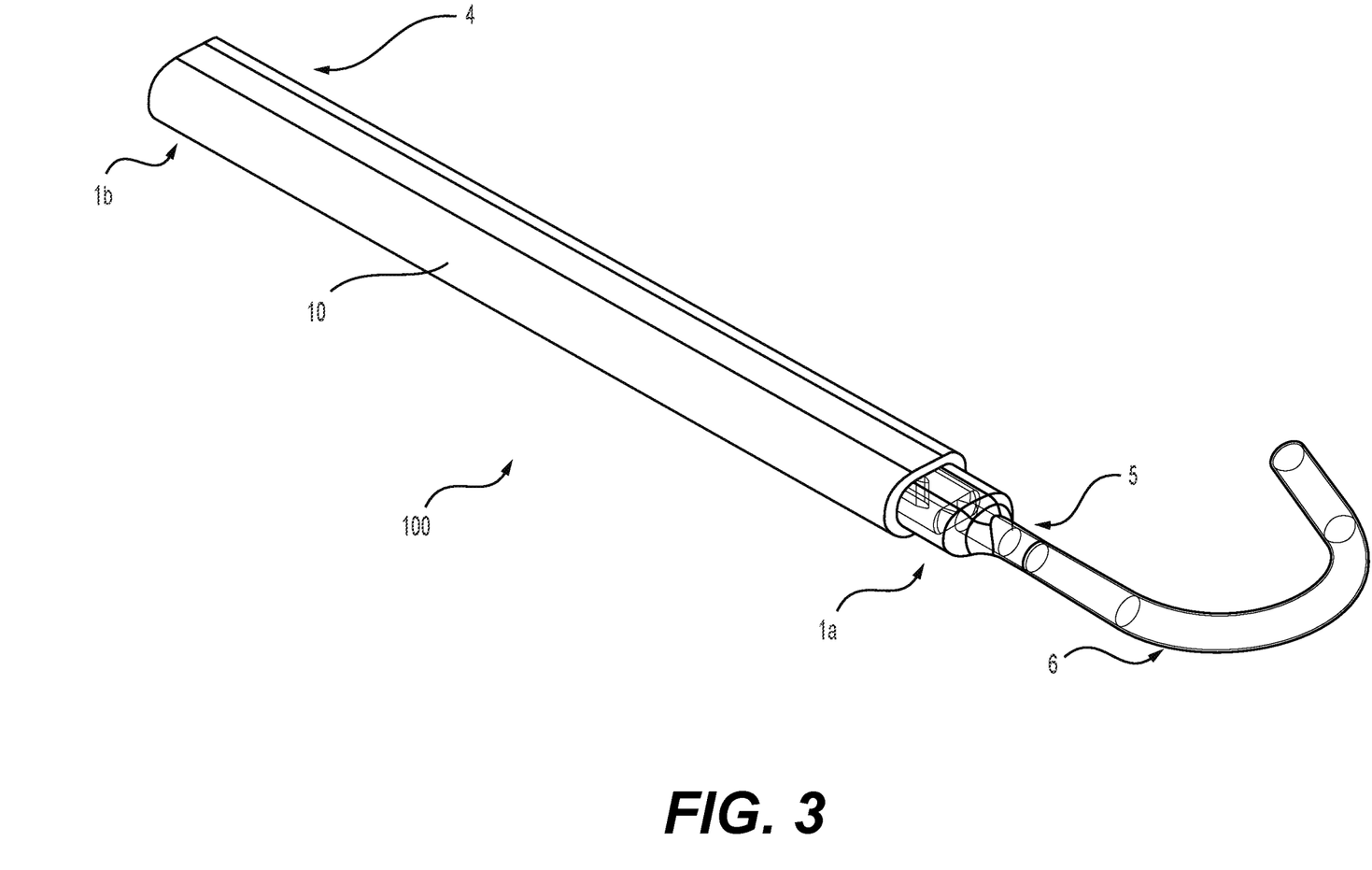
FIG. 3 is a perspective view of the catheter of the nasal suction apparatus, shown with a porous fabric cover.

Turning now to FIG. 3, the nasal suction apparatus 100 is shown with a porous fabric cover 10 provided on catheter 1. Porous fabric cover 10 allows for the suction of air, moisture, and liquid, such as blood, through catheter 1 while preventing the passage of solid debris, such as blood clots or tissue fragments. Porous fabric cover 10 prevents obstruction of the suction holes by solid debris and ensures an equal distribution of suction through suction holes 4. Porous fabric cover 10 may be any material capable of allowing the suction of liquid or air therethrough while preventing passage of solid debris. Porous fabric cover 10 may be made, by way of non-limiting example, from sterile cotton gauze or other similar surgical gauze. A flexible tube 6 is shown in FIG. 3 connected with catheter 1 at mating end 5. The other end of flexible tube 6 may be in connection with any suitable source of suction. In a non-limiting example, the source of suction may be a motorized pump or a vacuum, but it should be apparent that any suitable source of suction may be used. In another non-limiting example, the tube 6 may be made of a silicon, such as a flexible sterile disposable silicon.

Figure 4:
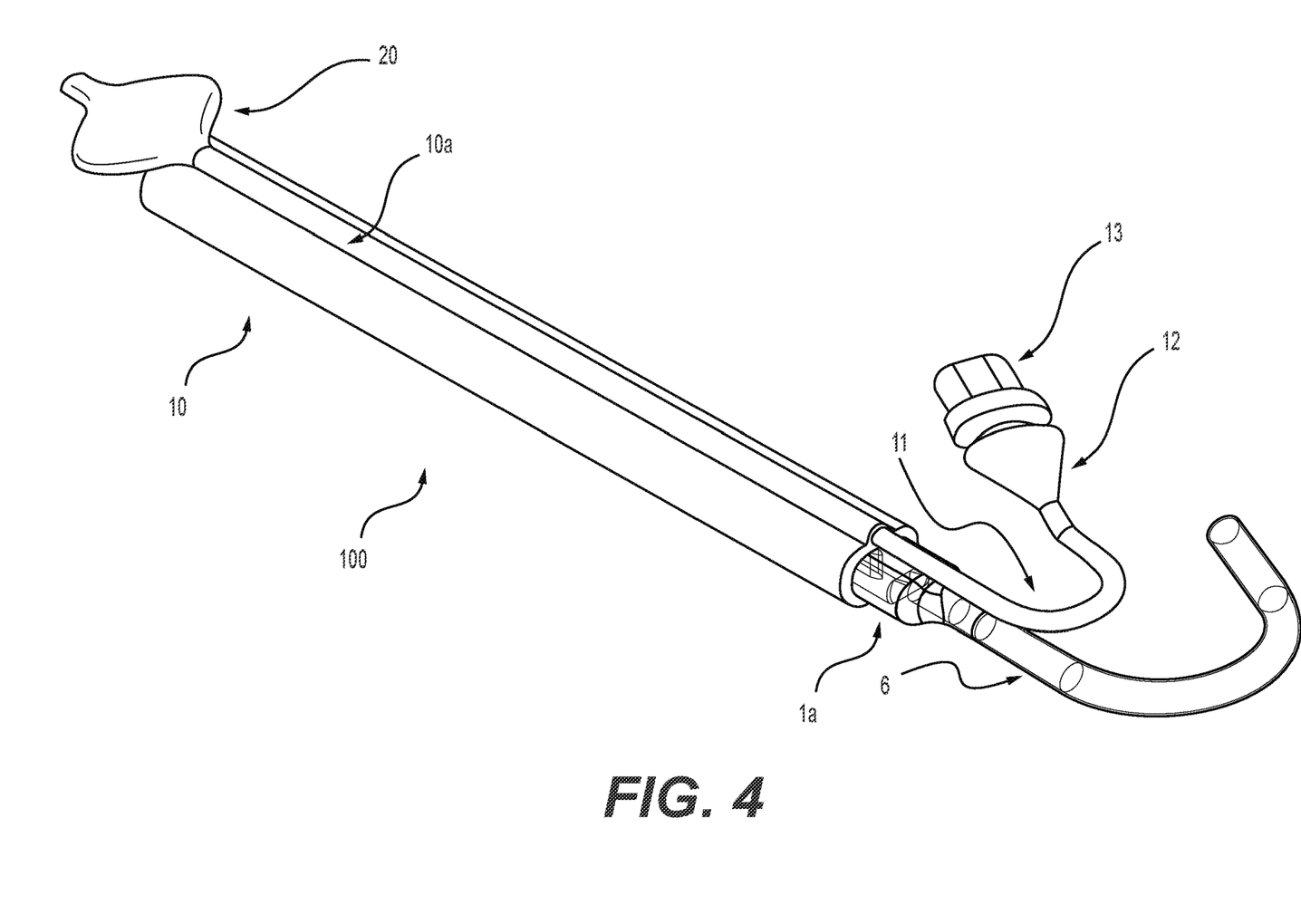
FIG. 4 is a perspective view of an alternative embodiment of the nasal suction apparatus.

In the alternative embodiment of FIG. 4, the nasal suction apparatus 100 is shown with the addition of a cuff 20. In the non-limiting example of FIG. 4, cuff 20 is shown as a balloon in connection with a flexible tube 11, a pilot balloon 12 and valve 13. Pilot balloon 12 inflates or deflates in conjunction with, and as an indication of, the inflation level of cuff 20. Valve 13 may be provided to allow for inflation or deflation (i.e., pressure relief) of cuff 20. Valve 13 may be, for example, a one-way check valve that provides pressure relief by releasing air into the surrounding environment. Flexible tube 11 may be connected to fabric cover 10 through use of a fabric lumen 10a sewn into cover 10. Any suitable connection, however, may be provided for joining flexible tube 11 to fabric cover 10.

Figure 5:
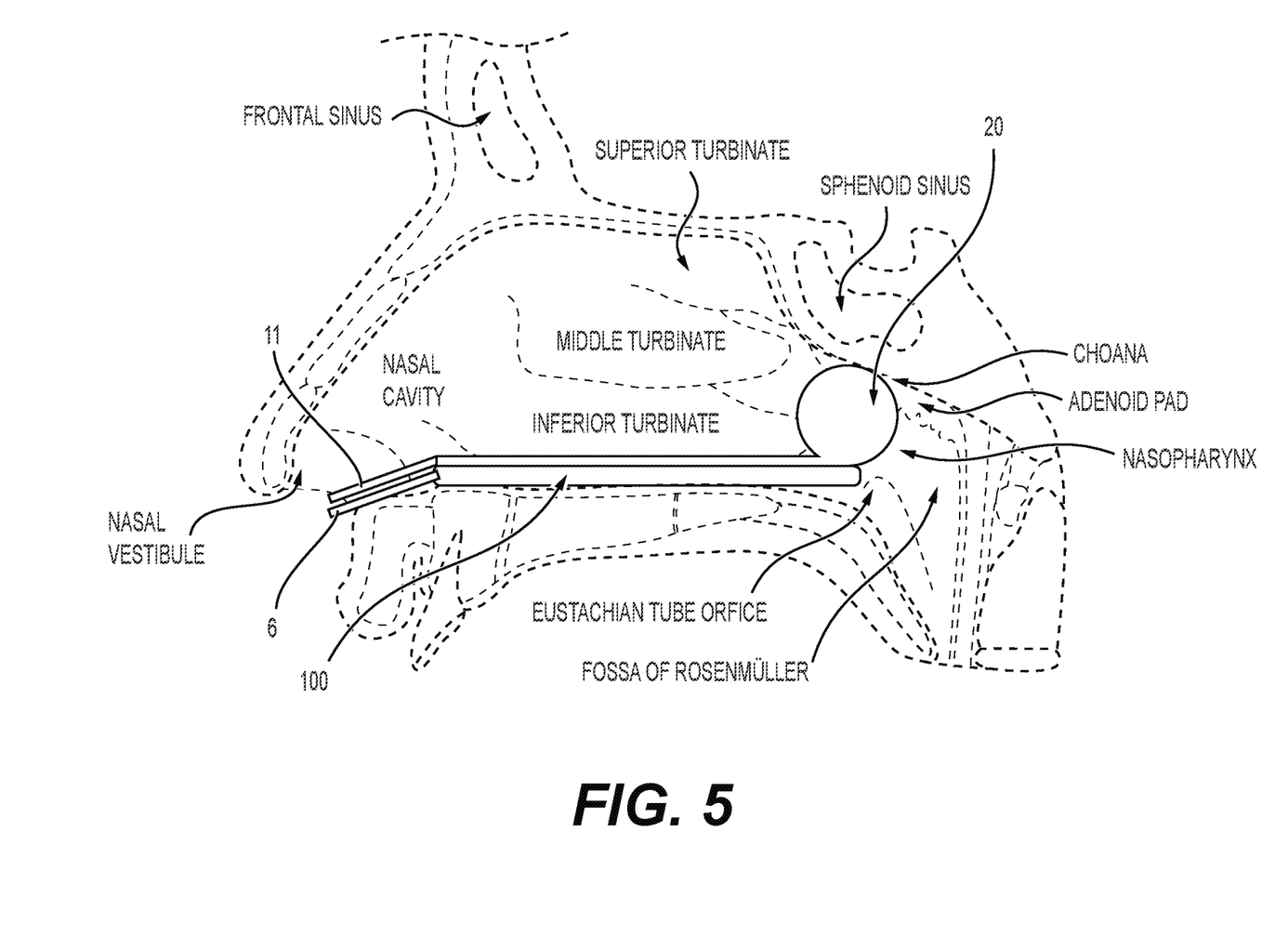
FIGS. 5, 5A, and 5B illustrate the nasal suction apparatus in use during a surgical procedure.

Referring now to FIG. 5, a method of using the nasal suction apparatus 100 of the present invention is illustrated. During an endoscopic surgical procedure in the sinonasal tract, the nasal suction apparatus 100 is inserted such that distal end 1b of catheter 1 lies in the nasopharynx region as illustrated in FIG. 5. Insertion may be through the nasal vestibule, as shown in FIG. 5, but could also be through the oral cavity.

Figure 5A:
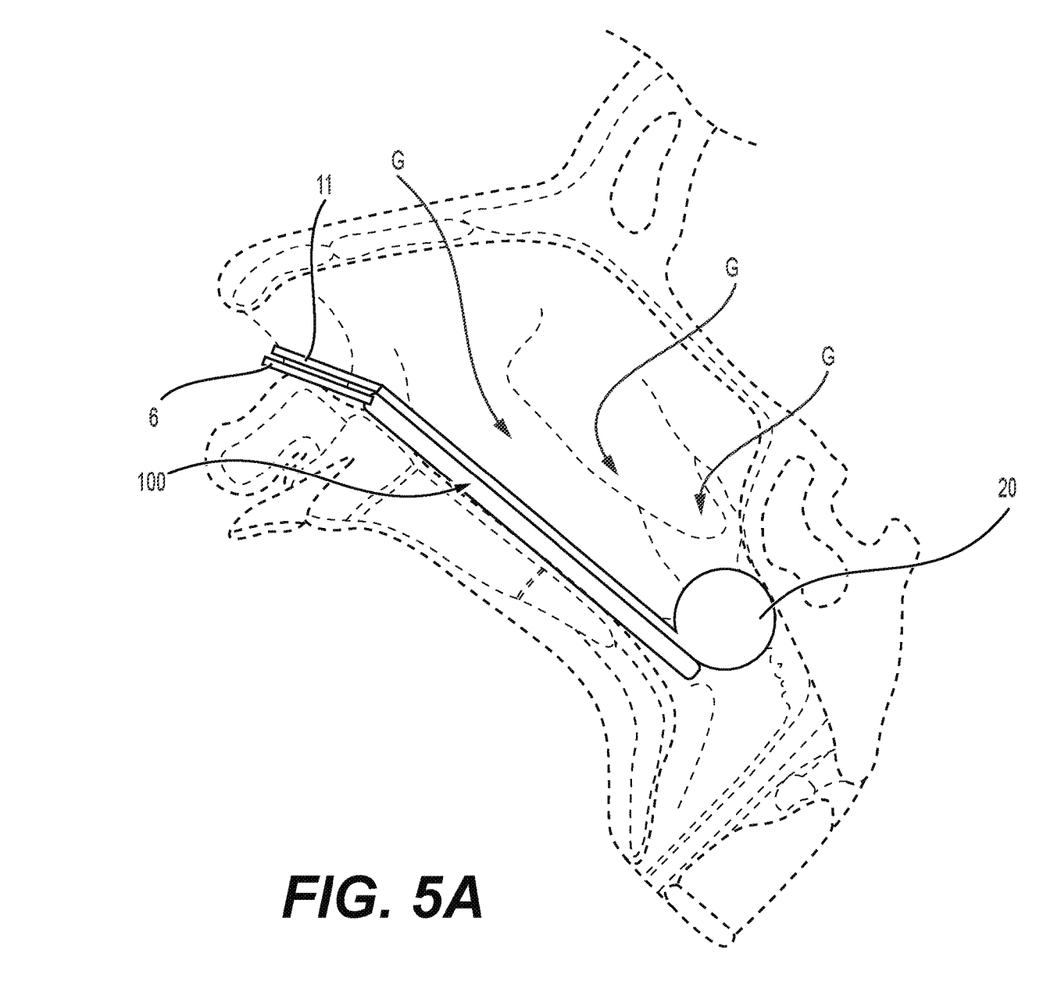
Figure 5B:
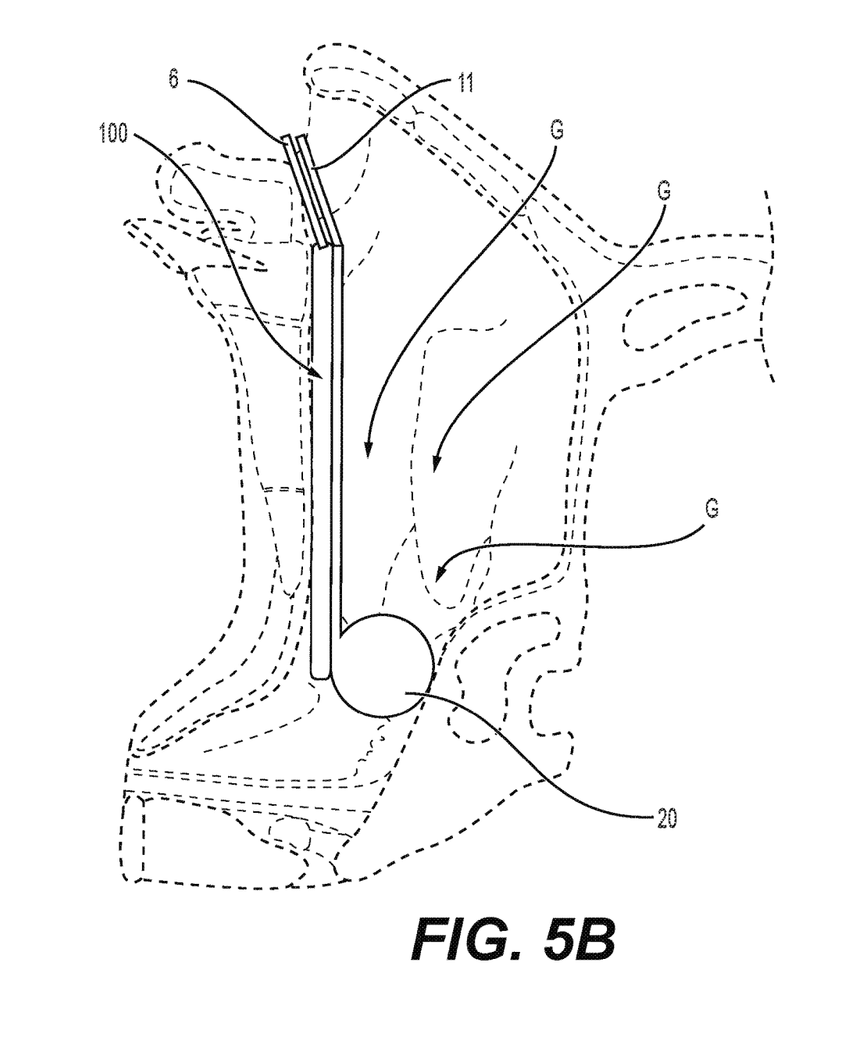

Once the distal end 1b of the catheter 1 has reached the nasopharynx region, cuff 20 may be inflated to retain catheter 1 in place and prevent blood and debris from passing past apparatus 100 into the esophageal region. After inflating cuff 20, suction is provided through the suction holes and porous fabric cover, as discussed above with regard to FIGS. 1-4. As a patient lies in a supine or semi-seated (i.e., approximately) 45° position, gravity may force blood towards distal end 1b of catheter 100 to be effectively suctioned and prevented from entering the esophagus or upper respiratory tract. FIG. 5A shows the nasal suction apparatus when a patient is in a semi-seated (approximately) 45° position, with arrows G indicating the direction of gravity. FIG. 5B shows a patient in supine or lying down position with arrows G indicating the flow of gravity toward the distal end of the suction apparatus. In an embodiment, the cuff 20 or balloon is inflated in the nasopharynx only.

In accordance with the present methods, the apparatus 100 can be designed to fit an interior meatus space and extend to the nasopharynx, which is away from the surgical field "middle meatus", in use. Further, the apparatus 100 can be used in any relevant sinus and/or skull surgeries, such as skull base surgeries, and other doctors office-based procedures.

It is to be understood that the nasal suction apparatus is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A nasal suction apparatus, comprising:
a catheter having a proximal end and a distal end, the catheter comprising first and second lumens extending parallel to one another from the proximal end to the distal end, the first and second lumens being divided by an inner partition, wherein a plurality of suction holes is formed in the distal end of said catheter, the plurality of suction holes being arranged on opposite sides of the catheter in an alternating, staggered relationship;
a flexible tube attached to the catheter at the proximal end thereof, the flexible tube configured to be in connection with a source of suction;
a cuff for retaining said catheter in a sinonasal tract of a patient; and
a porous fabric cover placed over said plurality of suction holes and running along a length of the catheter from the proximal end of the catheter to the distal end of the catheter and covering a distal tip of the catheter the fabric cover preventing obstruction of the plurality of suction holes by solid debris while allowing suction of air and liquid, wherein the porous fabric cover further includes a first lumen which is configured to receive the first and second lumens of the catheter such that said flexible tube in connection with said source of suction is connected to said porous fabric cover by being positioned in said first lumen,
wherein the catheter is configured for insertion through a nasal vestibule of the patient,
wherein said cuff is a balloon that is configured to be fully inflated when the balloon is situated directly under a sphenoid sinus of the patient such that the fully inflated balloon seals both choanae of the patient,
wherein said balloon is in connection with another flexible tube, a pilot balloon, and a pressure relief valve, and
wherein said porous fabric cover further includes a fabric lumen sewn into said porous fabric cover, said fabric lumen being external to said first lumen of said porous fabric cover and running along a length of the catheter from the proximal end of said catheter to the distal end of said catheter such that said another flexible tube in connection with said balloon is connected to said porous fabric cover by being positioned in said fabric lumen.

2. The nasal suction apparatus as recited in claim 1, wherein said inner partition contacts an inner surface of a distal end face of the catheter.

3. A method of providing suction during a surgical procedure, the method comprising:
inserting a distal end of a catheter into a nasopharynx region of a patient; and
applying suction to the catheter through a flexible tube connected to a proximal end of the catheter,
wherein the catheter comprises:
first and second lumens extending from the proximal end to a distal end of the catheter in parallel to one another, the first and second lumens being separated by an inner partition, wherein a plurality of suction holes is positioned in the distal end of the catheter, the plurality of suction holes being arranged on opposite sides of the catheter in an alternating, staggered relationship;
a cuff for retaining said catheter in a sinonasal tract of the patient; and
a porous fabric cover placed over said plurality of suction holes and running along a length of the catheter from the proximal end of the catheter to the distal end of the catheter and covering a distal tip of the catheter the cover preventing obstruction of the plurality of suction holes by solid debris and allowing suction of air and liquid, wherein the porous fabric cover further includes a first lumen which is configured to receive the first and second lumens of the catheter such that said flexible tube in connection with said source of suction is connected to said porous fabric cover by being positioned in said first lumen,
wherein prior to reaching the nasopharynx region, the catheter is inserted through a nasal vestibule of the patient,
wherein said cuff is a balloon that is configured to be fully inflated when the balloon is situated directly under a sphenoid sinus of the patient such that the fully inflated balloon seals both choanae of the patient,
wherein said balloon is in connection with another flexible tube, a pilot balloon, and a pressure relief valve, and
wherein said porous fabric cover further includes a fabric lumen sewn into said porous fabric cover, said fabric lumen being external to said first lumen of said porous fabric cover and running along a length of the catheter from the proximal end of said catheter to the distal end of said catheter such that said another flexible tube in connection with said balloon is connected to said porous fabric cover by being positioned in said fabric lumen.

4. The method of providing suction during a surgical procedure as recited in claim 3, wherein the distal end of the catheter is closed and in contact with the inner partition.

5. A nasal suction apparatus, comprising:
a catheter having a proximal end and a distal end, the catheter being closed at a distal end face and comprising first and second lumens extending parallel to one another from the proximal end to the distal end, the first and second lumens being divided by an inner partition contacting said distal end face, wherein a plurality of suction holes is formed in the distal end of said catheter, the plurality of suction holes being arranged on opposite sides of the catheter in an alternating, staggered relationship;
a flexible tube attached to the catheter at the proximal end thereof, the flexible tube configured to be in connection with a source of suction;
a cuff for retaining said catheter in a sinonasal tract of a patient; and
a porous fabric cover placed over said plurality of suction holes and running along a length of the catheter from the proximal end of the catheter to the distal end of the catheter and covering a distal tip of the catheter the fabric cover preventing obstruction of the plurality of suction holes by solid debris while allowing suction of air and liquid, wherein the porous fabric cover further includes a first lumen which is configured to receive the first and second lumens of the catheter such said flexible tube configured to be in connection with said source of suction is connected to said porous fabric cover by being positioned in said first lumen,
wherein the catheter is configured for insertion through a nasal vestibule of the patient,
wherein said cuff is a balloon that is configured to be fully inflated when the balloon is situated directly under a sphenoid sinus of the patient such that the fully inflated balloon seals both choanae of the patient, and
wherein said porous fabric cover further includes a fabric lumen sewn into said porous fabric cover, said fabric lumen being external to said first lumen of said porous fabric cover and running along the length of the catheter from the proximal end of said catheter to the distal end of said catheter such that another flexible tube configured to be in connection with said balloon is connected to said porous fabric cover by being positioned in said fabric lumen.

* * * * *